(12) United States Patent
Zhang

(10) Patent No.: US 10,116,131 B2
(45) Date of Patent: Oct. 30, 2018

(54) OVER-CURRENT PROTECTION CIRCUITS AND LIQUID CRYSTAL DEVICES

(71) Applicant: Shenzhen China Star Optoelectronics Technology Co., Ltd., Shenzhen, Guangdong (CN)

(72) Inventor: Xianming Zhang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 344 days.

(21) Appl. No.: 15/100,418

(22) PCT Filed: May 16, 2016

(86) PCT No.: PCT/CN2016/082189
§ 371 (c)(1),
(2) Date: May 31, 2016

(87) PCT Pub. No.: WO2017/185422
PCT Pub. Date: Nov. 2, 2017

(65) Prior Publication Data
US 2018/0097350 A1    Apr. 5, 2018

(30) Foreign Application Priority Data
Apr. 27, 2016  (CN) .......................... 2016 1 0269787

(51) Int. Cl.
*H02H 3/08* (2006.01)
*G02F 1/1333* (2006.01)

(52) U.S. Cl.
CPC ............. *H02H 3/08* (2013.01); *G02F 1/1333* (2013.01)

(58) Field of Classification Search
USPC .................................................. 361/87, 93.1
See application file for complete search history.

(56) References Cited

U.S. PATENT DOCUMENTS

2003/0137254 A1   7/2003  Bang
2005/0219863 A1*  10/2005 Fukumoto ............... H02M 1/36
                                                    363/16
(Continued)

FOREIGN PATENT DOCUMENTS

CN      102945655 A    2/2013
CN      103199506 A    7/2013
(Continued)

*Primary Examiner* — Ronald W Leja
(74) *Attorney, Agent, or Firm* — Andrew C. Cheng

(57) ABSTRACT

An over-current protection circuit includes a detection circuit, a first protection branch, and a second protection branch. The detection circuit is configured for obtaining a first detection voltage. The first protection branch compares the first detection voltage and the first reference voltage. When the first detection voltage is smaller than the first reference voltage, the detection circuit obtains the second detection voltage. The second protection branch compares the second detection voltage and the second reference voltage. When the second detection voltage is greater than or equals to the second reference voltage, the second protection branch cuts off the current inputted to the input end of the over-current protection circuit. The second reference voltage equals to the reference detection voltage plus the predetermined initial value. The over-current protection circuit may amend the protection voltage to avoid over-current issue.

18 Claims, 2 Drawing Sheets

(56) References Cited

U.S. PATENT DOCUMENTS

| | | | |
|---|---|---|---|
| 2011/0235220 A1 | 9/2011 | Huang | |
| 2014/0176014 A1* | 6/2014 | Hu | G09G 3/3426 |
| | | | 315/307 |
| 2014/0347774 A1* | 11/2014 | Uehara | H02H 3/0935 |
| | | | 361/87 |
| 2015/0188431 A1* | 7/2015 | Cho | G09G 3/2003 |
| | | | 345/212 |
| 2016/0267833 A1* | 9/2016 | Lee | H05B 33/0803 |
| 2017/0004773 A1* | 1/2017 | Kim | G09G 3/006 |
| 2017/0256222 A1* | 9/2017 | Kuo | G09G 3/3677 |
| 2018/0035512 A1* | 2/2018 | Nagao | H05B 33/0887 |
| 2018/0097350 A1* | 4/2018 | Zhang | H02H 3/08 |
| 2018/0115151 A1* | 4/2018 | Cao | H02H 7/1213 |

FOREIGN PATENT DOCUMENTS

| | | |
|---|---|---|
| CN | 104237612 A | 12/2014 |
| CN | 105162077 A | 12/2015 |
| CN | 105304050 A | 2/2016 |
| CN | 105448260 A | 3/2016 |

\* cited by examiner

OVER-CURRENT PROTECTION CIRCUITS AND LIQUID CRYSTAL DEVICES

CROSS REFERENCE

This application claims the priority of Chinese Patent Application No. 201610269787.0, entitled "Over-current protection circuits and liquid crystal devices", filed on Apr. 27, 2016, the disclosure of which is incorporated herein by reference in its entirety.

FIELD OF THE INVENTION

The present invention relates to liquid crystal display technology field, and more particularly to an over-current protection circuit and a liquid crystal device (LCD).

BACKGROUND OF THE INVENTION

Gate Driver On Array (GOA) technology relates to manufacture a gate scanning driving circuit of thin film transistor (TFT) on array substrates so as to replace the solution wherein an external chip is adopted as a driving chip. As the GOA circuit may be configured in a rim of the panel, and thus may be capable of reducing the thickness of the border of the liquid crystal device (LCD). In addition, the manufacturing process may be simplified, the cost may be reduced, and the density of the integration of the liquid crystal panel may be enhanced.

The gate voltage for the TFTs in each of the rows of the LCD may be provided by the GOA circuit. Generally, clock control signals generated by level shifters are configure to turn on or off the TFTs in each of the rows. During the manufacturing process of LCDs, when the plastic frame of the LCD is not closely sealed, the GOA circuit within the panel may be short-connected. As such, huge current signals may be generated and the Over Current Protection (OC) circuit may be activated to turn off the level shifter so as to prevent the liquid crystal panel from being burn out. When the short-connected node is in a low resistance short-connection, the current may be huge, and thus the OCP circuit may be easily triggered. For most of the time, after the short-connection, there is still resistance in the short-connected node. At this moment, the current may not be huge, but the current may be gradually increased with increasing time. In the end, the panel may be burn out when the current is huge enough. Thus, it is difficult to configure a precise protection point when configuring the OCP protection current. When the protection point it too huge, the short-connected panel may be omitted, and may be burn out.

SUMMARY OF THE INVENTION

The present disclosure relates to an over-current protection circuit for adjusting the over-current protection voltage so as to protect the circuit.

In one aspect, an over-current protection circuit includes: a detection circuit, a first protection branch, and a second protection branch, the detection circuit is configured for detecting a current of an output end of the over-current protection circuit in a real-time manner, and for obtaining a first detection voltage in accordance with the current of the output end of the over-current protection circuit, the first protection branch is configured for comparing the first detection voltage and a first reference voltage, when the first detection voltage is smaller than the first reference voltage, the second protection branch obtains a reference detection voltage in accordance with the first detection voltage of a first normal operation, when the first detection voltage is smaller than the first reference voltage, the detection circuit detects the current of the output end of the over-current protection circuit in a real-time manner, and obtains a second detection voltage in accordance with the current of the output end of the over-current protection circuit, the second protection branch compares the second detection voltage and a second reference voltage, when the second detection voltage is greater than or equals to the second reference voltage, the second protection branch cuts off the current inputted to the input end of the over-current protection circuit, wherein the second reference voltage equals to a sum of the reference detection voltage plus a predetermined initial value, and the predetermined initial value is a positive number.

Wherein the first protection branch includes a first voltage comparator and a first field effect (FET) tube, an non-inverting input of the first voltage comparator receives the first detection voltage, an inverting input of the first voltage comparator receives the first reference voltage, an output end of the first voltage comparator connects to a gate of the first FET, a source of a first FET electrically connects to the input end of the over-current protection circuit, a drain of the first FET is grounded, the first voltage comparator compares the first detection voltage with the first reference voltage, the first FET is turned off when the first detection voltage is smaller than the first reference voltage.

Wherein the first FET is a NOMS transistor, when the first voltage comparator determines that the first detection voltage signals are smaller than the first reference voltage, the first voltage comparator outputs low level via a first output end, and the first FET is turned off in accordance with the low level outputted by the first output end.

Wherein the second protection branch includes a second voltage comparator and a second FET, an non-inverting end of the second voltage comparator receives the second reference voltage, an output end of the second voltage comparator electrically connects to a gate of the second FET, a source of the second FET electrically connects to the input end of the over-current protection circuit, a drain of the second FET is grounded, the second voltage comparator compares the second detection voltage and the second reference voltage, when the second detection voltage is greater than or equals to the second reference voltage, the second FET is turned on.

Wherein the second FET is a NOMS transistor, when the second detection voltage signals are greater than or equal to the second reference voltage, the second voltage comparator outputs high level via a second output end, and the second FET is turned on in accordance with the high level outputted by the second output end.

Wherein the second protection branch includes an addition arithmetic unit having a first input end, a second input end, and an output end, the first end receives the reference detection voltage, the second input end receives the predetermined initial value, the addition arithmetic unit obtains the second reference voltage by adding the reference detection voltage and the predetermined initial value, and the second reference voltage is outputted via the output end of the addition arithmetic unit.

Wherein when the first detection voltage is greater than or equals to the first reference voltage, the first protection branch cuts off the current inputted to the input end of the over-current protection circuit.

Wherein the detection circuit includes a current detection circuit and a current-voltage converter, the first voltage comparator detects the current signals of the output end of the over-current protection circuit and amplifies the current signals to obtain effective current signals, and the current-voltage converter receives the effective current signals and converts the effective current signals to be corresponding voltage signals.

Wherein the current detection circuit includes a third FET and a fourth FET, a gate of the third FET electrically connects to a gate of the fourth FET, a source of the third FET electrically connects to a source of the fourth FET, a drain of the third FET operates as an input end of the current detection circuit for detecting the current signals of the output end of the over-current protection circuit, and a drain of the fourth FET operates as the output end of the current detection circuit to output the effective current signals.

In another aspect, a liquid crystal device (LCD) includes: an over-current protection circuit comprising a detection circuit, a first protection branch, and a second protection branch, the detection circuit is configured for detecting a current of an output end of the over-current protection circuit in a real-time manner, and for obtaining a first detection voltage in accordance with the current of the output end of the over-current protection circuit, the first protection branch is configured for comparing the first detection voltage and a first reference voltage, when the first detection voltage is smaller than the first reference voltage, the second protection branch obtains a reference detection voltage in accordance with the first detection voltage of a first normal operation, when the first detection voltage is smaller than the first reference voltage, the detection circuit detects the current of the output end of the over-current protection circuit in a real-time manner, and obtains a second detection voltage in accordance with the current of the output end of the over-current protection circuit, the second protection branch compares the second detection voltage and a second reference voltage, when the second detection voltage is greater than or equals to the second reference voltage, the second protection branch cuts off the current inputted to the input end of the over-current protection circuit, wherein the second reference voltage equals to a sum of the reference detection voltage plus a predetermined initial value, and the predetermined initial value is a positive number.

Wherein the first protection branch includes a first voltage comparator and a first field effect (FET) tube, an non-inverting input of the first voltage comparator receives the first detection voltage, an inverting input of the first voltage comparator receives the first reference voltage, an output end of the first voltage comparator connects to a gate of the first FET, a source of a first FET electrically connects to the input end of the over-current protection circuit, a drain of the first FET is grounded, the first voltage comparator compares the first detection voltage with the first reference voltage, the first FET is turned off when the first detection voltage is smaller than the first reference voltage.

Wherein the first FET is a NOMS transistor, when the first voltage comparator determines that the first detection voltage signals are smaller than the first reference voltage, the first voltage comparator outputs low level via a first output end, and the first FET is turned off in accordance with the low level outputted by the first output end.

Wherein the second protection branch includes a second voltage comparator and a second FET, an non-inverting end of the second voltage comparator receives the second reference voltage, an output end of the second voltage comparator electrically connects to a gate of the second FET, a source of the second FET electrically connects to the input end of the over-current protection circuit, a drain of the second FET is grounded, the second voltage comparator compares the second detection voltage and the second reference voltage, when the second detection voltage is greater than or equals to the second reference voltage, the second FET is turned on.

Wherein the second FET is a NOMS transistor, when the second detection voltage signals are greater than or equal to the second reference voltage, the second voltage comparator outputs high level via a second output end, and the second FET is turned on in accordance with the high level outputted by the second output end. Wherein the second protection branch includes an addition arithmetic unit having a first input end, a second input end, and an output end, the first end receives the reference detection voltage, the second input end receives the predetermined initial value, the addition arithmetic unit obtains the second reference voltage by adding the reference detection voltage and the predetermined initial value, and the second reference voltage is outputted via the output end of the addition arithmetic unit.

Wherein when the first detection voltage is greater than or equals to the first reference voltage, the first protection branch cuts off the current inputted to the input end of the over-current protection circuit.

Wherein the detection circuit includes a current detection circuit and a current-voltage converter, the first voltage comparator detects the current signals of the output end of the over-current protection circuit and amplifies the current signals to obtain effective current signals, and the current-voltage converter receives the effective current signals and converts the effective current signals to be corresponding voltage signals.

Wherein the current detection circuit includes a third FET and a fourth FET, a gate of the third FET electrically connects to a gate of the fourth FET, a source of the third FET electrically connects to a source of the fourth FET, a drain of the third FET operates as an input end of the current detection circuit for detecting the current signals of the output end of the over-current protection circuit, and a drain of the fourth FET operates as the output end of the current detection circuit to output the effective current signals.

In view of the above, the current detection circuit respectively detects the current signals of each of the GOA circuits and converts the current signals into the first detection voltage. When the voltage comparator determines that the first detection voltage is smaller than the first reference voltage, the second protection branch obtains a reference detection voltage in accordance with the first detection voltage of a first normal operation. The second protection branch compares the second detection voltage and a second reference voltage, when the second detection voltage is greater than or equals to the second reference voltage, the second protection branch cuts off the current inputted to the input end of the over-current protection circuit. The over-current protection circuit may amend the protection voltage to avoid over-current issue. The LCD includes the above over-current protection circuit such that the protection voltage may be amended to avoid the over-current issue.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
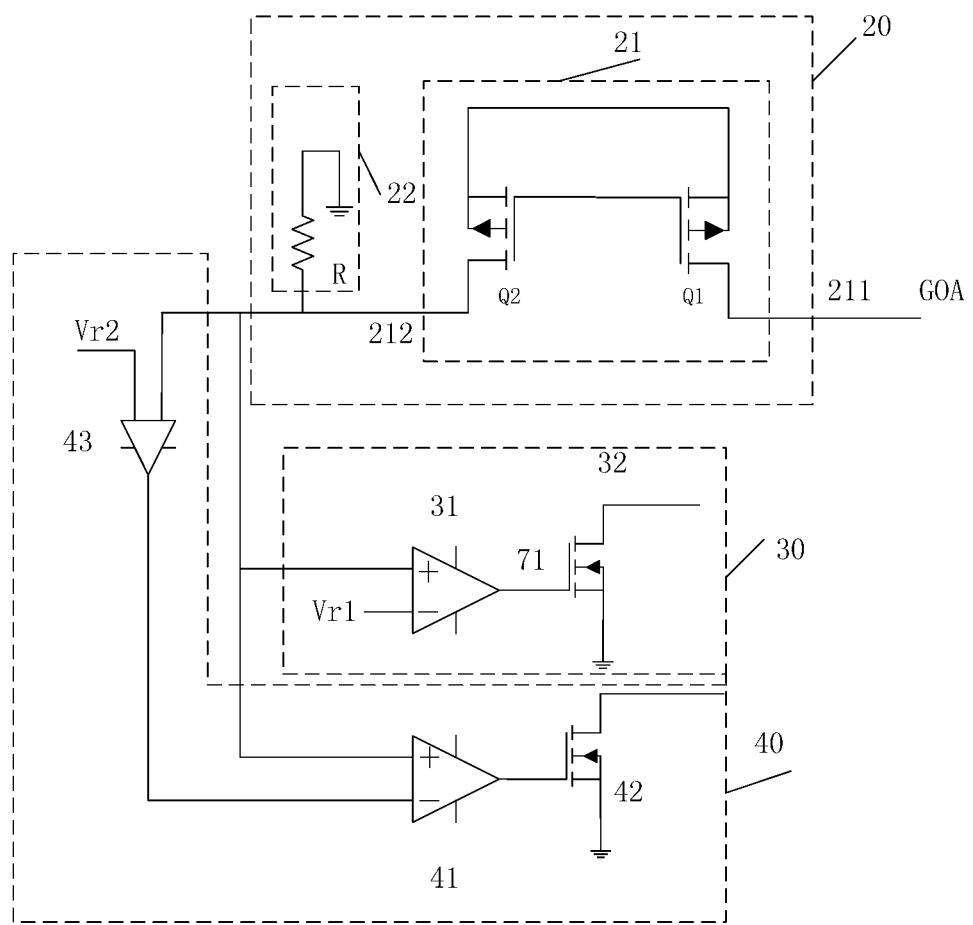
FIG. 1 is a circuit diagram of the over-current protection circuit in accordance with one embodiment.

FIG. 1 is a circuit diagram of the over-current protection circuit in accordance with one embodiment. The over-current protection circuit includes a detection circuit 20, a first protection branch 30, and a second protection branch 40. The detection circuit 20 is configured for detecting the current of the output end of the over-current protection circuit, and for obtaining a first detection voltage in accordance with the current of the output end of the over-current protection circuit. The detection circuit 20 includes a current detection circuit 21 and a current-voltage converter 22. The first protection branch 30 is configured for comparing the first detection voltage and the first reference voltage. The first protection branch 30 includes a first voltage comparator 31 and a first field effect tube (FET) 32. The second protection branch is configured for comparing the second detection voltage and the second reference voltage. When the second detection voltage is greater or equal to the second reference voltage, the second protection branch cuts off an input current of the input end of the over-current protection circuit. The second protection branch 40 includes a second voltage comparator 41 and a second FET 42.

An input end 211 of the current detection circuit 21 connects to the output end of the over-current protection circuit. An output end 210 of the current detection circuit 21 connects to the current-voltage converter 22. The current-voltage converter 22 connects to an non-inverting input of the first voltage comparator 31 and the non-inverting input of the second FET 42. The inverting input of the first voltage comparator 31 connects to the first reference voltage (Vr1). The output end of the first voltage comparator 31 connects to a gate of the first FET 32. The output end of the second voltage comparator 41 connects to the gate of the second FET 42.

It can be understood that the output end of the over-current protection circuit may connect to a GOA circuit, and the input end of the over-current protection circuit may connect to a timing control circuit.

The input end 211 of the current detection circuit 21 respectively detects current signals of the GOA circuits at each level, amplifies the current signals to obtain effective current signals, and outputs the effective current signals to the current-voltage converter 22. The current-voltage converter 22 is configured to covert the detected current signals into voltage signals. For instance, the detected current signals of 1 mA are converted into the voltage signals of 10 mV, wherein the greater the detected current signals, the greater the converted voltage signals. The current-voltage converter 22 may convert the effective current signals, and the effective current signals are outputted to the non-inverting inputs of the first voltage comparator 31 and the second voltage comparator 41.

The voltage comparator is configured to compare two input voltages, and to output high level or low level according to a comparing result. Specifically, when the voltage of the non-inverting input (input end "+") is greater than the voltage of the inverting input (input end "−"), the voltage comparator outputs the high level.

When the voltage of the non-inverting input (input end "+") is smaller than the voltage of the inverting input (input end "−"), the voltage comparator outputs the low level. The logic switching circuit 70 includes a first FET. The gate of the FET is turned on upon receiving the high level, and the gate of the FET is turned off upon receiving the low level.

The current detection circuit 21 detects the current of the output end of the over-current protection circuit, and obtains the first detection voltage after the current is converted by the current-voltage converter 22. The first protection branch 30 compares the first detection voltage and the first reference voltage (Vr1) by the first voltage comparator 31. When the first detection voltage is smaller than the first reference voltage (Vr1), the over-current protection circuit operates normally. At this moment, the second protection branch 40 obtains the reference detection voltage in accordance with the first detection voltage of the first normal operation. That is, the reference detection voltage equals to the first detection voltage. When the first detection voltage is smaller than the first reference voltage, the detection circuit detects the current of the output end of the over-current protection circuit in a real-time manner, and obtains the second detection voltage in accordance with the current of the output end of the over-current protection circuit. The second protection branch 40 compares the second detection voltage and the second reference voltage. When the second protection branch 40 compares the second detection voltage and the second reference voltage and when the second detection voltage is greater than or equals to the second reference voltage, the second protection branch cuts off the current inputted to the input end of the over-current protection circuit, wherein the second reference voltage equals to a sum of the reference detection voltage plus a predetermined initial value. The predetermined initial value is a positive number.

Further, the second protection branch 40 also includes an addition arithmetic unit 43 having a first input end, a second input end, and an output end. The first input end and the second input end are Interchangeable. The first input end connects to the current-voltage converter 22, and the second input end connects to a predetermined initial value (Vr2). The output end connects to the inverting input of the second FET 42. The second reference voltage is obtained after the reference detection voltage is processed by the addition arithmetic unit 43. The reference detection voltage is greater than the reference detection voltage. The predetermined initial value (Vr2) may be configured within the circuit in accordance with real scenario.

When the first voltage comparator 31 determines that the first detection voltage signals are smaller than the first reference voltage (Vr1) of the first voltage comparator 31, the first voltage comparator 31 outputs the low level to the first FET 32. The first FET 32 remains being connected by the low level such that the circuit outputs the current. At this moment, the circuit operates normally. The addition arithmetic unit 43 processes the first detection voltage, i.e., the normal operation voltage, and then outputs the second reference voltage. The inverting input of the second FET 42 receives the second reference voltage. Afterward, if the operation voltage exceeds the second reference voltage, the second FET 42 outputs the low level to the second FET 42. The second FET 42 is disconnected, and the circuit stops outputting current such that the over-current protection works. During the operations, when the first voltage comparator 31 determines that the first detection voltage is greater than or equal to the first reference voltage (Vr1), the first voltage comparator 31 outputs the high level to the first FET 32. The first FET 32 disconnects the circuit in accordance with the high level so as to activate the over-current protection.

In one embodiment, when the first reference voltage (Vr1) is configured to be 100 V, the circuit operates normally when the effective voltage is 40V. The effective voltage is processed by the addition arithmetic unit 43 (the second reference voltage is configured to be 20 V), and the addition voltage equaling to 43 V is outputted to the inverting input of the second voltage comparator 41. If the GOA circuit is short-connected, the effective voltage is increased to be 70 V. At this moment, the first voltage comparator 31 outputs the low level, but the second voltage comparator 41 outputs the high level. Thus, the logic switching circuit 70 is triggered and the power supply is disconnected. The proposed over-current protection circuit is capable of adjusting the protection voltage so as to avoid the circuit damage caused by a high protection voltage.

In one embodiment, when the first reference voltage (Vr1) is configured as 80 V and when the first detection voltage is configured as 70 V, the circuit operates normally. After the first detection voltage is processed by the addition arithmetic unit 43 (assuming the predetermined initial value (Vr2) is configured to be 20 V), the second reference voltage equaling to 70V is outputted to the inverting input of the second voltage comparator 41. If the GOA circuit is short-connected, the second detection voltage is increased to be 85V. At this moment, the first voltage comparator 31 outputs the high level. Although the second FET 42 outputs the low level, the over-current protection circuit is still disconnected. Thus, the protection voltage of the proposed over-current protection circuit will not be increased.

In one embodiment, if the first reference voltage (Vr1) is configured to be 100V and if the first detection voltage is configured to be 110 V, the first voltage comparator 31 outputs the high level. The first FET 32 is triggered, and the circuit is disconnected to activate the over-current protection. At this moment, there is no current inputted to the second voltage comparator 41.

As the current of the GOA circuit is smaller, usually, and the thus the current has to be amplified so as to be detected. The current-voltage converter 22 receives the current outputted from the current detection circuit 21, and converts the current to a corresponding voltage. Preferably, a relationship table regarding the current and the voltage is pre-stored within the current-voltage converter 22. In the relationship table, the current and the voltage are in a positive relation. Preferably, the current detection circuit 21 includes a third FET (Q1) and a fourth FET (Q2). A drain of the third FET (Q1) connects to the GOA circuit, a source of the third FET (Q1) and the source of the fourth FET (Q2) connects to a gate driving voltage, a gate of the third FET (Q1) connects to a gate of the fourth FET (Q2), a drain of the third FET (Q1) operates as an input end of the over-current protection circuit for detecting the current signals of the output end of the over-current protection circuit. The drain of the fourth FET (Q2) connects to the current-voltage converter 22. The current detection circuit 21 amplifies the detected current signals to be the effective current signals, and outputs the current signals to the current-voltage converter 22.

Preferably, the third FET (Q1) and the fourth FET (Q2) are NMOS transistors.

Preferably, the current-voltage converter 22 controls the voltage converted by the current via controlling the resistance of the resistor (R). Specifically, the first end of the resistor (R) connects to the drain of the fourth FET (Q2), and the non-inverting inputs of the first voltage comparator 31 and the second voltage comparator 41, and the second end of the resistor (R) is grounded, wherein 43=I×R, wherein "I" relates to the current inputted from the current-voltage converter 22, and "43" relates to the voltage outputted by the current-voltage converter 22. The greater the resistance of the resistor (R) is, the greater converting capability, i.e., converting the current into the voltage, of the current-voltage converter 22 is. In the embodiment, the resistance of the resistor (R) may be configured in accordance with the reference voltage of the first voltage comparator 31. When the current of the current detection circuit 21 is amplified by a certain times, the greater the reference voltage of the first voltage comparator 31 is, the greater the resistor (R) is. In the embodiment, the converting capability of the current-voltage converter 22 may be flexibly adjusted by configuring the resistor (R).

Figure 2:
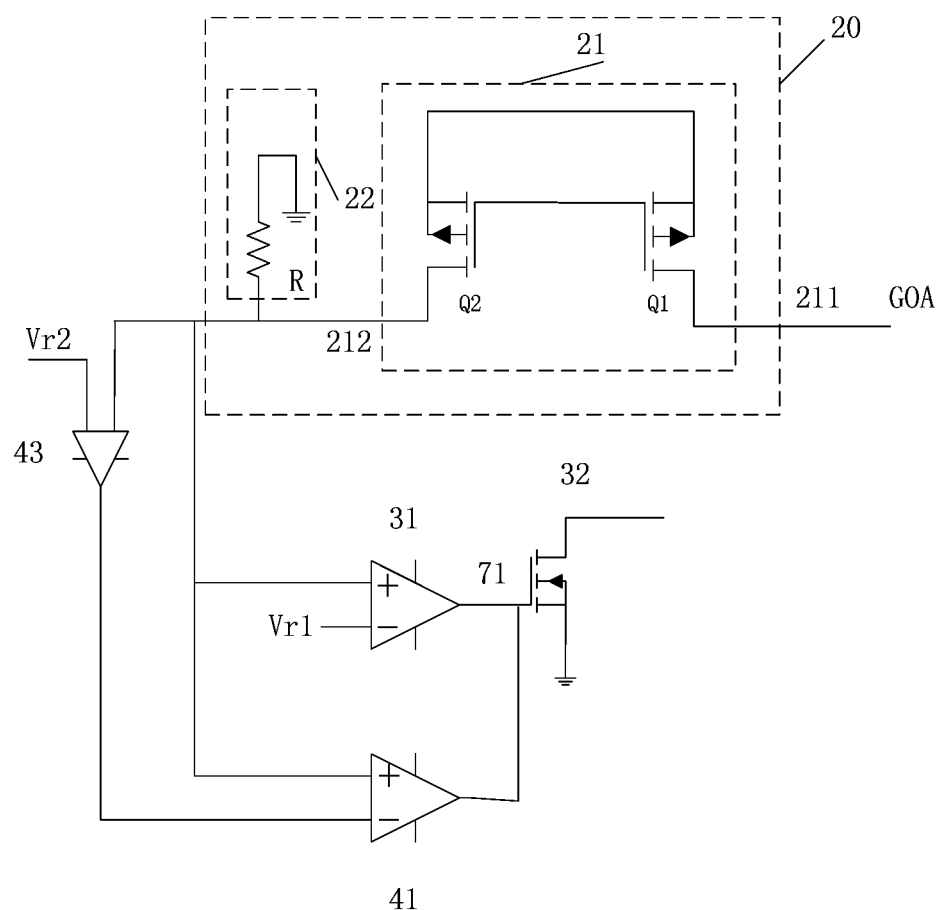
FIG. 2 is a circuit diagram of the over-current protection circuit in accordance with another embodiment.

It can be understood that, referring to FIG. 2, the output end of the second FET 42 may connect to the gate of the first FET 32, and thus the second FET 42 may be omitted. In another example, the output end of the first FET 32 may connect to the gate of the second FET 42 to omit the first FET 32.

The present disclosure also includes a LCD including the over-current protection circuit as shown in FIG. 1. The descriptions of the over-current protection circuit may be referenced in the above, and thus are omitted hereinafter.

In the description of the present specification, the term "one embodiment," "some embodiments", "an example", "concrete example", or "some examples" relates to specific features, structures, or characteristics contained in at least one embodiment or example. In the specification, the above terms may relate to different embodiments and examples. Furthermore, the specific features, structures, materials, or characteristics may be combined in any one or more of the exemplary embodiments in a suitable manner.

Above are embodiments of the present invention, which does not limit the scope of the present invention. Any modifications, equivalent replacements or improvements within the spirit and principles of the embodiment described above should be covered by the protected scope of the invention.

What is claimed is:

1. An over-current protection circuit, comprising:
  a detection circuit, a first protection branch, and a second protection branch, the detection circuit is configured for detecting a current of an output end of the over-current protection circuit in a real-time manner, and for obtaining a first detection voltage in accordance with the current of the output end of the over-current protection circuit, the first protection branch is configured for comparing the first detection voltage and a first reference voltage, when the first detection voltage is smaller than the first reference voltage, the second protection branch obtains a reference detection voltage in accordance with the first detection voltage of a first normal operation, when the first detection voltage is smaller than the first reference voltage, the detection circuit detects the current of the output end of the over-current protection circuit in a real-time manner, and obtains a second detection voltage in accordance with the current of the output end of the over-current protection circuit, the second protection branch compares the second detection voltage and a second reference voltage, when the second detection voltage is greater than or equals to the second reference voltage, the second protection branch cuts off the current inputted to the input end of the over-current protection circuit, wherein the second reference voltage equals to a sum of the reference detection voltage plus a predetermined initial value, and the predetermined initial value is a positive number.

2. The over-current protection circuit as claimed in claim 1, wherein the first protection branch comprises a first voltage comparator and a first field effect (FET) tube, an non-inverting input of the first voltage comparator receives the first detection voltage, an inverting input of the first voltage comparator receives the first reference voltage, an output end of the first voltage comparator connects to a gate of the first FET, a source of a first FET electrically connects to the input end of the over-current protection circuit, a drain of the first FET is grounded, the first voltage comparator compares the first detection voltage with the first reference voltage, the first FET is turned off when the first detection voltage is smaller than the first reference voltage.

3. The over-current protection circuit as claimed in claim 2, wherein the first FET is a NOMS transistor, when the first voltage comparator determines that the first detection voltage signals are smaller than the first reference voltage, the first voltage comparator outputs low level via a first output end, and the first FET is turned off in accordance with the low level outputted by the first output end.

4. The over-current protection circuit as claimed in claim 1, wherein the second protection branch comprises a second voltage comparator and a second FET, an inverting end of the second voltage comparator receives the second reference voltage, an output end of the second voltage comparator electrically connects to a gate of the second FET, a source of the second FET electrically connects to the input end of the over-current protection circuit, a drain of the second FET is grounded, the second voltage comparator compares the second detection voltage and the second reference voltage, when the second detection voltage is greater than or equals to the second reference voltage, the second FET is turned on.

5. The over-current protection circuit as claimed in claim 4, wherein the second FET is a NOMS transistor, when the second detection voltage signals are greater than or equal to the second reference voltage, the second voltage comparator outputs high level via a second output end, and the second FET is turned on in accordance with the high level outputted by the second output end.

6. The over-current protection circuit as claimed in claim 4, wherein the second protection branch comprises an addition arithmetic unit having a first input end, a second input end, and an output end, the first end receives the reference detection voltage, the second input end receives the predetermined initial value, the addition arithmetic unit obtains the second reference voltage by adding the reference detection voltage and the predetermined initial value, and the second reference voltage is outputted via the output end of the addition arithmetic unit.

7. The over-current protection circuit as claimed in claim 1, wherein when the first detection voltage is greater than or equals to the first reference voltage, the first protection branch cuts off the current inputted to the input end of the over-current protection circuit.

8. The over-current protection circuit as claimed in claim 1, wherein the detection circuit comprises a current detection circuit and a current-voltage converter, the first voltage comparator detects the current signals of the output end of the over-current protection circuit and amplifies the current signals to obtain effective current signals, and the current-voltage converter receives the effective current signals and converts the effective current signals to be corresponding voltage signals.

9. The over-current protection circuit as claimed in claim 8, wherein the current detection circuit comprises a third FET and a fourth FET, a gate of the third FET electrically connects to a gate of the fourth FET, a source of the third FET electrically connects to a source of the fourth FET, a drain of the third FET operates as an input end of the current detection circuit for detecting the current signals of the output end of the over-current protection circuit, and a drain of the fourth FET operates as the output end of the current detection circuit to output the effective current signals.

10. A liquid crystal device (LCD), comprising:
an over-current protection circuit comprising a detection circuit, a first protection branch, and a second protection branch, the detection circuit is configured for detecting a current of an output end of the over-current protection circuit in a real-time manner, and for obtaining a first detection voltage in accordance with the current of the output end of the over-current protection circuit, the first protection branch is configured for comparing the first detection voltage and a first reference voltage, when the first detection voltage is smaller than the first reference voltage, the second protection branch obtains a reference detection voltage in accordance with the first detection voltage of a first normal operation, when the first detection voltage is smaller than the first reference voltage, the detection circuit detects the current of the output end of the over-current protection circuit in a real-time manner, and obtains a second detection voltage in accordance with the current of the output end of the over-current protection circuit, the second protection branch compares the second detection voltage and a second reference voltage, when the second detection voltage is greater than or equals to the second reference voltage, the second protection branch cuts off the current inputted to the input end of the over-current protection circuit, wherein the second reference voltage equals to a sum of the reference detection voltage plus a predetermined initial value, and the predetermined initial value is a positive number.

11. The LCD as claimed in claim 10, wherein the first protection branch comprises a first voltage comparator and a first field effect (FET) tube, an non-inverting input of the first voltage comparator receives the first detection voltage, an inverting input of the first voltage comparator receives the first reference voltage, an output end of the first voltage comparator connects to a gate of the first FET, a source of a first FET electrically connects to the input end of the over-current protection circuit, a drain of the first FET is grounded, the first voltage comparator compares the first detection voltage with the first reference voltage, the first FET is turned off when the first detection voltage is smaller than the first reference voltage.

12. The LCD as claimed in claim 11, wherein the first FET is a NOMS transistor, when the first voltage comparator determines that the first detection voltage signals are smaller than the first reference voltage, the first voltage comparator outputs low level via a first output end, and the first FET is turned off in accordance with the low level outputted by the first output end.

13. The LCD as claimed in claim 10, wherein the second protection branch comprises a second voltage comparator and a second FET, an inverting end of the second voltage comparator receives the second reference voltage, an output end of the second voltage comparator electrically connects to a gate of the second FET, a source of the second FET electrically connects to the input end of the over-current protection circuit, a drain of the second FET is grounded, the second voltage comparator compares the second detection voltage and the second reference voltage, when the second detection voltage is greater than or equals to the second reference voltage, the second FET is turned on.

14. The LCD as claimed in claim 13, wherein the second FET is a NOMS transistor, when the second detection voltage signals are greater than or equal to the second reference voltage, the second voltage comparator outputs high level via a second output end, and the second FET is turned on in accordance with the high level outputted by the second output end.

15. The LCD as claimed in claim 13, wherein the second protection branch comprises an addition arithmetic unit having a first input end, a second input end, and an output end, the first end receives the reference detection voltage, the second input end receives the predetermined initial value, the addition arithmetic unit obtains the second reference voltage by adding the reference detection voltage and the predetermined initial value, and the second reference voltage is outputted via the output end of the addition arithmetic unit.

16. The LCD as claimed in claim 10, wherein when the first detection voltage is greater than or equals to the first reference voltage, the first protection branch cuts off the current inputted to the input end of the over-current protection circuit.

17. The LCD as claimed in claim 10, wherein the detection circuit comprises a current detection circuit and a current-voltage converter, the first voltage comparator detects the current signals of the output end of the over-current protection circuit and amplifies the current signals to obtain effective current signals, and the current-voltage converter receives the effective current signals and converts the effective current signals to be corresponding voltage signals.

18. The LCD as claimed in claim 17, wherein the current detection circuit comprises a third FET and a fourth FET, a gate of the third FET electrically connects to a gate of the fourth FET, a source of the third FET electrically connects to a source of the fourth FET, a drain of the third FET operates as an input end of the current detection circuit for detecting the current signals of the output end of the over-current protection circuit, and a drain of the fourth FET operates as the output end of the current detection circuit to output the effective current signals.

* * * * *